UNITED STATES PATENT OFFICE.

GEORGE W. MILES, OF SANDWICH, MASSACHUSETTS, ASSIGNOR TO AMERICAN CELLULOSE AND CHEMICAL MANUFACTURING COMPANY LTD., OF NEW YORK, N. Y., A CORPORATION OF DELAWARE.

METHOD OF TREATING CELLULOSE ACETATE AND THE PRODUCT THEREOF.

1,394,752.  Specification of Letters Patent.  Patented Oct. 25, 1921.

No Drawing.  Application filed November 14, 1919. Serial No. 338,131.

*To all whom it may concern:*

Be it known that I, GEORGE W. MILES, a citizen of the United States, and resident of Sandwich, in the county of Barnstable and State of Massachusetts, have invented new and useful Improvements in Methods of Treating Cellulose Acetate and the Product Thereof, of which the following is a specification.

Cellulose acetates, including the partially hydrated acetate, become plastic when saturated and heated with glycerin. Heretofore, however, the minimum proportion of glycerin which could be intimately mixed with and distributed through a mass of cellulose acetate has been so large that the resulting product, even when as much glycerin as possible had been pressed out of the cellulose acetate, has been too soft, and too liable to exude glycerin, to be adaptable to many useful purposes.

In their usual condition, cellulose acetates are light, fibrous, and composed of very minute fibrous particles which are difficult to wet thoroughly with such liquids as glycerin, unless the liquid be present in such large proportion that a very wet mush, like a porridge, may be produced by stirring and mixing the acetate and the liquid. Attempts to distribute thoroughly and intimately any small proportion of such a liquid through a mass of cellulose acetate, have failed.

By my method herein described I am enabled to distribute thoroughly through a mass of cellulose acetate any small percentage of glycerin which may be desired. The preferred practical proportion of glycerin by which many useful cellulose products may be made available, is between three and four per cent. of glycerin, by weight. The best results which I have obtained are from a mixture composed of 97% cellulose acetate and 3% glycerin.

My method for producing complete and intimate distribution of small percentages of glycerin through a mass of cellulose acetate, is as follows:

Take a quantity of dry cellulose acetate, mix it with an abundance of glycerin, and stir the mixture until all the cellulose acetate is soaked with glycerin. Then heat this mixture up to 250°–300° F., and maintain this temperature for a short time, say ten minutes, though less time will serve. The heating produces a complete and intimate wetting of the minute cellulose fibers, causing the glycerin to interpenetrate thoroughly.

Then strain out as much of the glycerin as can readily be removed by filtration, and wash the wet acetate with water until a sample of the washed acetate indicates by test that there remains associated with it the desired small percentage of glycerin. For the purposes presently to be alluded to, this percentage should be from three to three and a half per cent. The small percentage of glycerin is uniformly distributed through the mass of cellulose.

Experience will enable one to obtain the desired small residue of glycerin in the cellulose acetate with substantial accuracy. If, however, closer accuracy is desired, continue the washing of the cellulose acetate in water until all the glycerin that can be thus removed has been eliminated. Then prepare a water-glycerin mixture containing glycerin in such quantity as represents the small percentage (say 3% to 3½%) which is intended to distribute through the mass of washed cellulose acetate, using water enough to wet the acetate thoroughly. Then mix the cellulose acetate thoroughly with this glycerin-water mixture, and drive off the water by evaporation.

Apparently, the preliminary heating of the cellulose acetate with an abundance of glycerin renders the individual particles of the acetate receptive to, or retentive of, much smaller percentages of glycerin than can be distributed through it ordinarily.

A mixture of cellulose acetate with about 3% of glycerin is plastic under heat and pressure. To mold a solid homogeneous body of this composition, heat it in a mold for about fifteen minutes, maintaining a temperature of about 400° F., and then apply pressure to the material in the mold. When the mass has cooled a little it may be removed from the mold. The molded product is brown in tint, translucent, tough, an excellent electrical insulator, inflammable only in moderate degree. Many articles of manufacture heretofore composed of celluloid can be made of this cellulose acetate glycerin composition.

What I claim and desire to secure by Letters Patent is:

1. The method of rendering cellulose-acetate receptive to uniform distribution of glycerin in small quantities throughout the acetate, which consists in first heating cellulose acetate in admixture with an abundance of glycerin, then eliminating glycerin by washing with water.

2. The method of producing a cellulose acetate uniformly impregnated with a small percentage of glycerin, which consists in first heating cellulose acetate in admixture with an abundance of glycerin, then eliminating the glycerin by washing with water, then mixing the washed cellulose acetate with a glycerin-water mixture, and finally eliminating the water, as by evaporation.

3. Cellulose acetate, having distributed uniformly throughout the particles of its mass about three per cent. of glycerin.

4. A body composed of cellulose acetate and about three per cent. of glycerin uniformly distributed through it, and rendered integral and homogenous by heat and pressure.

Signed by me at Boston, Massachusetts, this 13 day of November 1919.

GEORGE W. MILES.